United States Patent
Cho et al.

(10) Patent No.: US 12,446,830 B2
(45) Date of Patent: Oct. 21, 2025

(54) WEARABLE DEVICE INCLUDING LEAKAGE CURRENT PREVENTION STRUCTURE

(71) Applicant: ATSENS CO., LTD., Gyeonggi-do (KR)

(72) Inventors: Seung Bum Cho, Gyeonggi-do (KR); Jong Ook Jeong, Gyeonggi-do (KR)

(73) Assignee: ATSENS CO., LTD., Gyeonggi-Do (KR)

( * ) Notice: Subject to any disclaimer, the term of this patent is extended or adjusted under 35 U.S.C. 154(b) by 1037 days.

(21) Appl. No.: 17/506,264

(22) Filed: Oct. 20, 2021

(65) Prior Publication Data

US 2022/0123347 A1    Apr. 21, 2022

(30) Foreign Application Priority Data

Oct. 21, 2020 (KR) .................. 10-2020-0137088

(51) Int. Cl.
*H01M 50/593* (2021.01)
*A61B 5/00* (2006.01)

(52) U.S. Cl.
CPC ......... *A61B 5/6833* (2013.01); *H01M 50/593* (2021.01); *A61B 5/681* (2013.01); *A61B 2560/0209* (2013.01); *A61B 2562/16* (2013.01); *A61B 2562/18* (2013.01)

(58) Field of Classification Search
CPC ......... H05K 1/181; H05K 2201/10151; H05K 5/069; G06F 1/163; G06F 1/1656; A61B 5/681; A61B 2560/0209; A61B 2562/16; Y02E 60/10; H01M 50/109
See application file for complete search history.

(56) References Cited

U.S. PATENT DOCUMENTS

2006/0187139 A1*  8/2006  Takakura .............. G04R 60/10
                                                    343/900

FOREIGN PATENT DOCUMENTS

JP    2013164925 A  *  8/2013
JP    2020146236 A  *  9/2020

OTHER PUBLICATIONS

Office Action issued in Korean counterpart application No. 10-2020-0137088 on Jan. 8, 2021, 5 pages.
Notice of Allowance issued to corresponding KR Application No. 10-2020-0137088, issued May 11, 2021, 2 pages.

* cited by examiner

*Primary Examiner* — James Wu
*Assistant Examiner* — Dakota M Talbert
(74) *Attorney, Agent, or Firm* — Bridgeway IP Law Group, PLLC; Sang Ho Lee; Hyun Woo Shin

(57) ABSTRACT

A wearable device having a leakage current preventing structure is provided. The wearable device includes a case having a structure which is electrically connected to a substrate and included in an internal space of the case and a slot formed in an upper surface of the case and communicating with the internal space, a battery arranged on the structure, a first electrode which is supported at one side of the structure and contacts one surface of the battery, a second electrode which is supported at the other side of the structure and contacts the other surface of the battery, and an insulation sheet that is inserted or removed through the slot and inserted between the battery and the first electrode or between the battery and the second electrode to block a leakage current of the battery.

6 Claims, 7 Drawing Sheets

WEARABLE DEVICE INCLUDING LEAKAGE CURRENT PREVENTION STRUCTURE

CROSS-REFERENCE TO RELATED APPLICATION

This application is based on and claims priority under 35 U.S.C. § 119 to Korean Patent Application No. 10-2020-0137088, filed on Oct. 21, 2020, in the Korean Intellectual Property Office, the disclosure of which is incorporated by reference herein in its entirety.

BACKGROUND

1. Field

One or more embodiments relate to a wearable device, and more particularly, to a wearable device including a structure for preventing an unnecessary leakage current.

2. Description of the Related Art

In general, a wearable device, particularly, that uses a non-rechargeable battery includes a button for starting an operation of the device. The wearable device includes a circuit to sense an operation of the button, and the circuit operates also when the wearable device is turned on and off.

Accordingly, a leakage current is generated from the circuit sensing an operation of the button even when the wearable device is not used. Thus, as the longer the wearable device is kept in a power off state, that is, the longer the storage time, the accumulated amount of leakage current is increased and the lifetime for using the wearable device is shortened.

In addition, a wearable device such as an electrocardiogram measuring device comes into contact with moisture, such as in a shower, while the user is wearing. The wearable device for a long time, a waterproof and dustproof function is required as well as a function of preventing leakage current.

The above-mentioned background art is technical information that the inventor possessed for the derivation of the present disclosure or acquired in the process of derivation of the present disclosure, and cannot be said to be a necessarily known technique disclosed to the general public prior to the filing of the present disclosure.

SUMMARY

One or more embodiments include a wearable device in which a leakage current generated therein is prevented and which has a waterproof and dustproof function.

The objective, however, is exemplary, and is not limited thereto.

Additional aspects will be set forth in part in the description which follows and, in part, will be apparent from the description, or may be learned by practice of the presented embodiments of the disclosure.

According to one or more embodiments, a wearable device includes: a case having a structure which is electrically connected to a substrate and included in an internal space of the case and a slot formed in an upper surface of the case and communicating with the internal space; a battery arranged on the structure; a first electrode which is supported at one side of the structure and contacts one surface of the battery; a second electrode which is supported at the other side of the structure and contacts the other surface of the battery; and an insulation sheet that is inserted or removed through the slot and inserted between the battery and the first electrode or between the battery and the second electrode to block a leakage current of the battery.

In at least one variant, the insulation sheet may include an insulation portion inserted between the battery and the first electrode or between the battery and the second electrode to block electrical contact; and a handle portion extending from one side of the insulation portion and having a greater width than the insulation portion.

In another variant, the insulation sheet may be inserted between the battery and the first electrode or between the battery and the second electrode through the slot to block electrical contact, when the wearable device is turned off, and may be separated from the case through the slot when the wearable device is turned on, to allow electrical contact between the battery and the first electrode or between the battery and the second electrode.

In another variant, the case may further include a seating groove which forms a step with respect to the upper surface of the case. The slot may be arranged in an inner portion of the case. The wearable device may further include a cover which is detachably coupled to one side of the insulation sheet. And while the cover is separated from the insulation sheet, the cover is further located in the seating groove and blocks the slot.

In another variant, the cover may further include: an observation portion having a through-hole having a shape corresponding to the slot; a waterproof portion arranged to cover an upper surface of the observation portion; and a protective film arranged on a lower surface of the observation portion and including a light-transmissive material.

In another variant, the insulation sheet may include a thin film including fiber or a plastic material, and a surface of the insulation sheet may be coated with fluorine.

In another variant, the case may include: a first guide surface arranged in an upper portion of the case and adjacent to the slot and inclined toward the inner portion of the case; and a second guide surface that is arranged in the upper portion of the case apart from the first guide surface and inclined at an angle equal to or different from the first guide surface.

Other aspects, features, and advantages other than those described above will become apparent from the accompanying drawings, the appended claims, and the detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
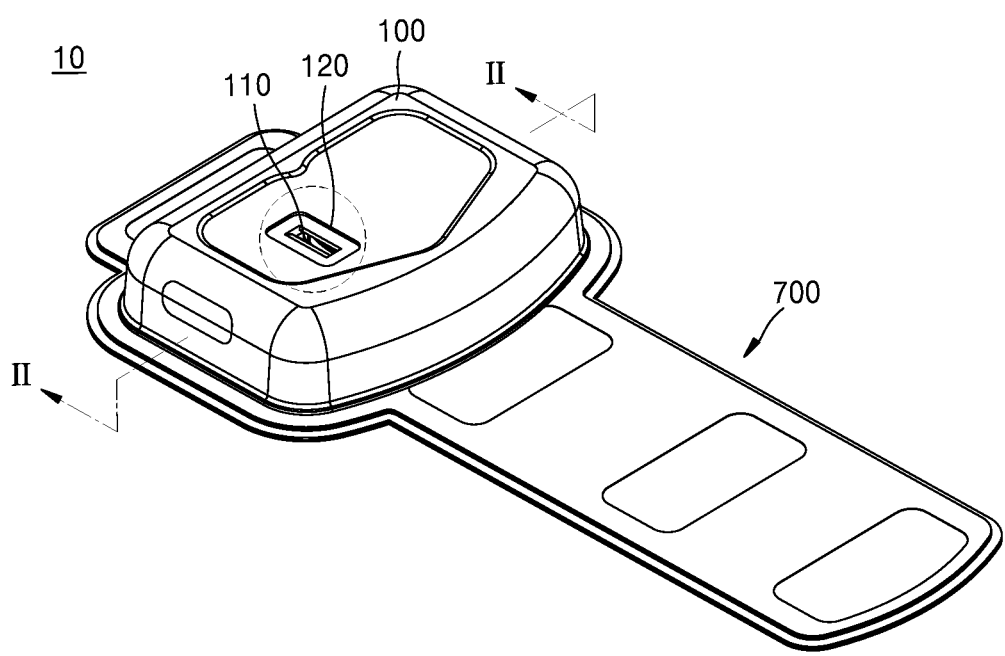
FIG. 1 illustrates a wearable device according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, particular embodiments will be illustrated in the drawings and described in detail in the written description of the disclosure. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, for those identical components illustrated with respect to different embodiments, the same reference numerals are used for the same components.

Hereinafter, embodiments of the present disclosure will be described in detail with reference to the accompanying drawings, and in the description with reference to the drawings, like reference numerals refer to like elements and redundant descriptions thereof will be omitted.

Herein, the terms "first", "second", etc. may be used to describe various components, and these components should not be limited by these terms. These terms are only used to distinguish one component from another.

Herein, an expression used in the singular form encompasses the expression in the plural form, unless it has a clearly different meaning in the context.

In the present specification, it is to be understood that the terms such as "including" or "having" are intended to indicate the existence of the features or components disclosed in the specification, and are not intended to preclude the possibility that one or more other features or components may be added.

In the drawings, for convenience of description, sizes of elements may be exaggerated or contracted. For example, since sizes and thicknesses of elements in the drawings are arbitrarily illustrated for convenience of explanation, the following embodiments are not limited thereto.

In the embodiments below, an x-axis, a y-axis, and a z-axis are not limited to three axes on a rectangular coordinates system but may be construed as including these axes. For example, an-x axis, a y-axis, and a z-axis may be at right angles or may also indicate different directions from one another, which are not at right angles.

When an embodiment is implementable in another manner, a predetermined process order may be different from a described one. For example, two processes that are consecutively described may be substantially simultaneously performed or may be performed in an opposite order to the described order.

The terms used in the present specification are merely used to describe particular embodiments, and are not intended to limit the present disclosure. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 2:
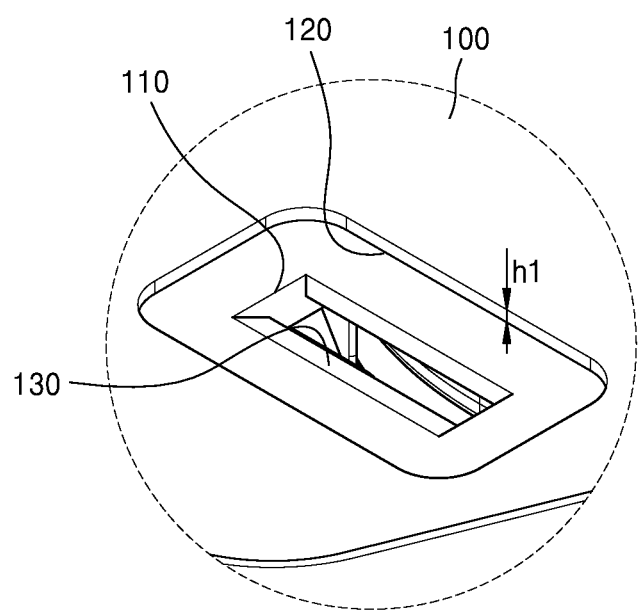
FIG. 2 is a cross-sectional view of a portion of taken line II-II of FIG. 1.
Figure 3:
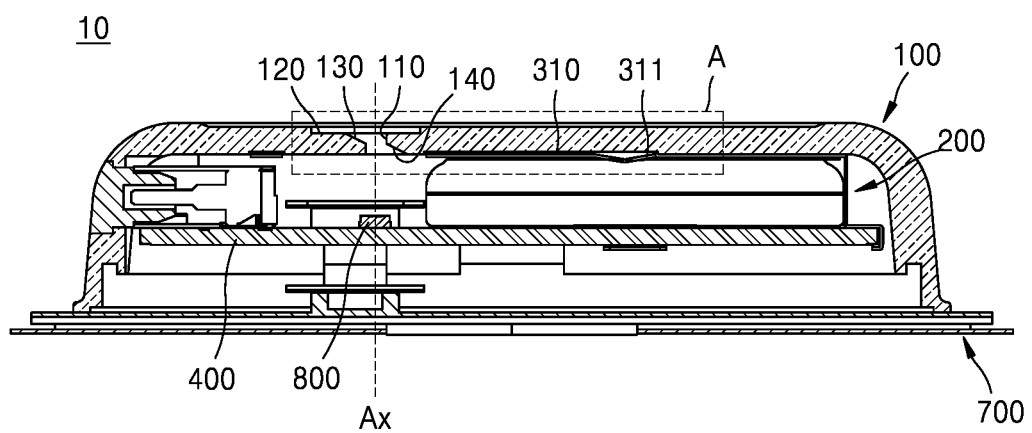
FIG. 3 illustrates a battery, an electrode, and a structure according to an embodiment of the present disclosure.
Figure 4:
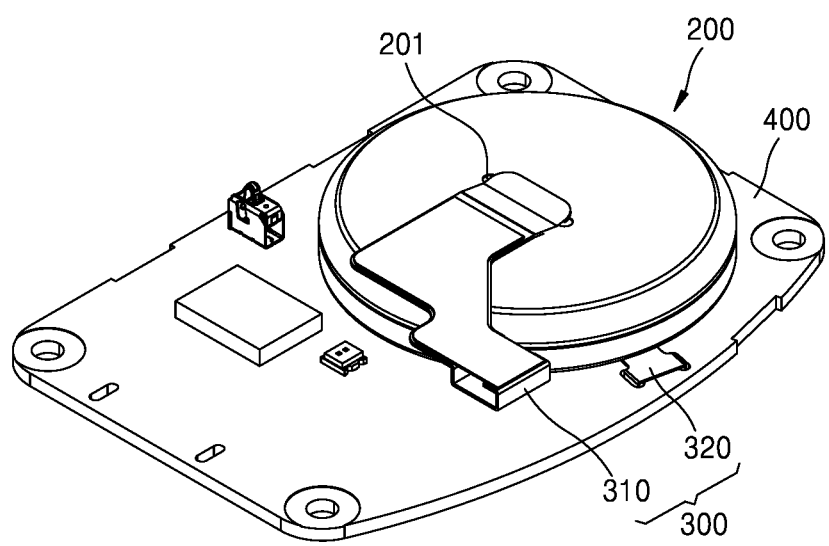
FIG. 4 is an enlarged view of a slot of FIG. 1.
Figure 5:
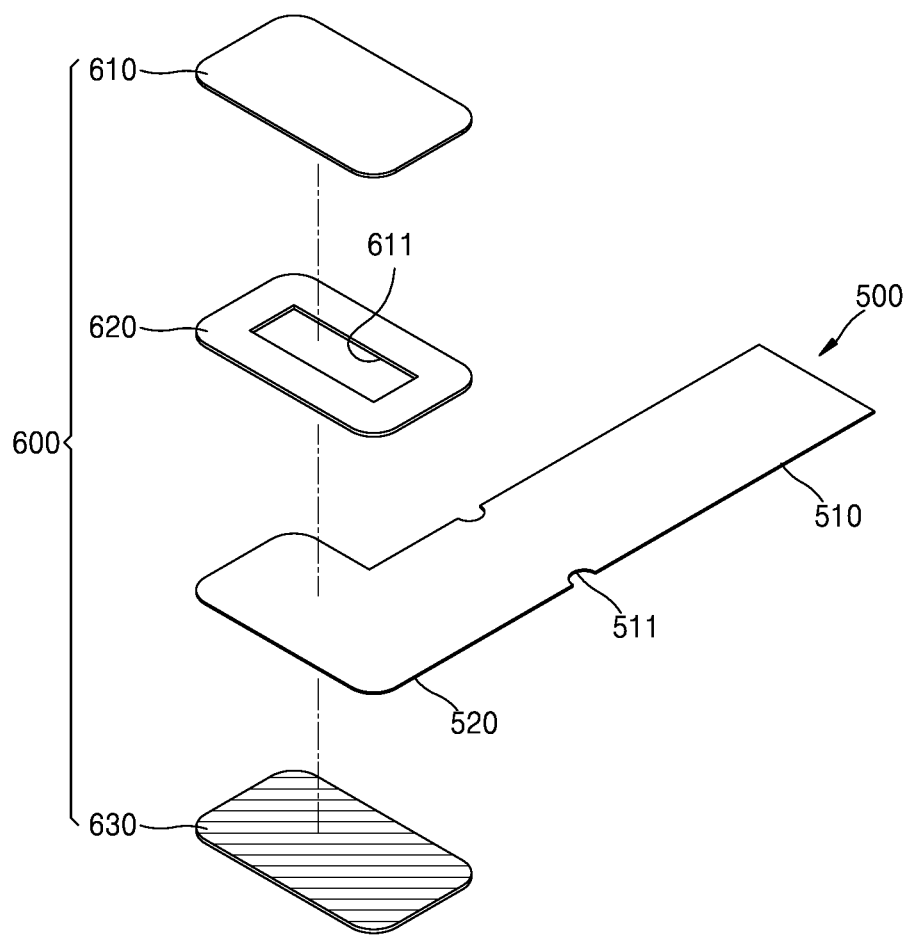
FIG. 5 is a disassembled perspective view of an insulation sheet and a cover according to an embodiment of the present disclosure.
Figure 6:
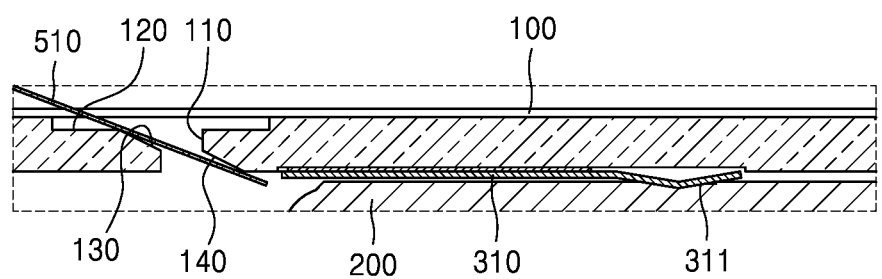
FIG. 6 illustrates a beginning state in which an insulation sheet is inserted into the case 100, according to an embodiment of the present disclosure.
Figure 7:
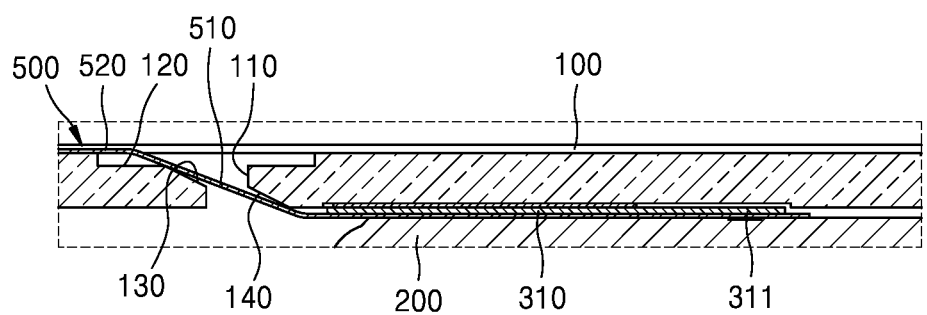
FIG. 7 illustrates a finishing state in which the insulation sheet has been inserted into the case 100, according to an embodiment of the present disclosure.

FIG. 1 illustrates a wearable device 10 according to an embodiment of the present disclosure. FIG. 2 is a cross-sectional view of a portion taken along line II-II of FIG. 1. FIG. 3 illustrates a battery 200, an electrode 300, and a structure 400 according to an embodiment of the present disclosure. FIG. 4 is an enlarged view of a slot 110 of FIG. 1. FIG. 5 is a disassembled perspective view of an insulation sheet 500 and a cover 600 according to an embodiment of the present disclosure. FIGS. 6 and 7 illustrate a state in which the insulation sheet 500 is inserted into the case 100, according to an embodiment of the present disclosure.

The wearable device 10 according to an embodiment of the present disclosure may include an electronic device that can be attached to or detached from a certain body part of a user. For example, the wearable device 10 may include a patch-type electrocardiogram measuring device which measures the electrocardiogram while the wearable device 10 is attached to the body of the user, such as on the chest or on the wrist. A user may carry out daily life routines such as a shower while wearing the wearable device 10. However, the type of the wearable device 10 is not particularly limited, and may include various types of detachable electronic devices.

In an embodiment, the wearable device 10 may be a contact switch-type using a button or a touch switch-type. In addition, the wearable device 10 may be provided with a circuit for detecting a contact point of a button or for detecting whether a touch is made thereon.

Referring to FIGS. 1 to 6, the wearable device 10 according to one or more embodiments of the present disclosure may include a case 100, the battery 200, the electrode 300, a structure 400, and the insulation sheet 500. In addition to these components, the wearable device 10 may further include an additional component for the wearable device 10 to operate as an electronic device. For example, the wearable device 10 may further include components to be attached to the user's body and measure an electrocardiogram, which are a processor, a memory, a display, a support frame, a coupling member, or the like. Hereinafter, the description will focus on certain components for convenience of description, but unless otherwise mentioned, components not described herein are not omitted from or reduced in the wearable device 10.

The case 100 constitutes a frame of the wearable device 10, and fixes and supports other members. As illustrated in FIGS. 1, 2, 3 and 4, the case 100 has an internal space, and the battery 200 and the like may be arranged in the internal space. The shape and size of the case 100 are not particularly limited, and the case 100 may have a shape and size that is easy to be gripped by the user or to be attached to the user's body.

In an embodiment, a substrate (not shown) and the structure 400 electrically connected to the substrate may be arranged in the internal space of the case 100. This will be described later.

In an embodiment, the case 100 may have the slot 110 in an upper surface thereof. It is also natural to implement the slot 110 in a side surface or a bottom surface.

As illustrated in FIGS. 2 and 3, the slot 110 may be arranged at one side of an upper surface of the case 100. The slot 110 is formed by a cut portion of the upper surface of the case 100 and may partition a region into or from which the insulation sheet 500 to be described later is inserted or separated. In addition, the slot 110 may be arranged to communicate with the internal space. The shape and size of the slot 110 are not particularly limited, and may have a shape and size corresponding to the insulation sheet 500 to be described later.

In an embodiment, the case 100 may further include a seating groove 120 in the upper surface thereof.

As illustrated in FIGS. 2 and 3, the seating groove 120 may be arranged in the upper surface of the case 100 to include the slot 110, that is, to have the slot 110 arranged at the inner side of the seating groove 120.

In an embodiment, the seating groove 120 may be formed to form a step with a first height h1 with respect to the upper surface of the case 100. The first height h1 may correspond to a height of the cover 600 to be described later. In addition, a shape of the seating groove 120 may also correspond to a shape of the cover 600. Accordingly, while the insulation sheet 500 is separated from the case 100, when the cover 600 is inserted into the seating groove 120, the slot 110 is covered by the cover 600, thus preventing penetration of external foreign substances such as moisture or dust into the case 100. This will be described in further detail later.

In an embodiment, the case 100 may further include a first guide surface 130.

As illustrated in FIGS. 2 and 3, the first guide surface 130 may be arranged on the upper surface of the case 100, that is, on an external surface of an upper portion of the case 100. The first guide surface 130 may be arranged adjacent to the slot 110 and inclined toward inside the case 100, that is, toward the internal space. Accordingly, the insulation sheet 500 to be described later may be inserted at a designated position (e.g., between the battery 200 and a first terminal 310) through the slot 110 along the first guide surface 130. An angle of inclination of the first guide surface 130 is not particularly limited, and may include an appropriate angle in consideration of positions of the battery 200 and the electrode 300.

In an embodiment, the case 100 may further include a second guide surface 140.

As illustrated in FIGS. 2 and 3, the second guide surface 140 may be arranged on an inner surface of the upper portion of the case 100. In an embodiment, the second guide surface 140 may be arranged adjacent to the slot 110, and may be arranged parallel to the first guide surface 130. Accordingly, the insulation sheet 500 to be described later may be inserted at a designated position through the slot 110 along the second guide surface 140. An angle of inclination of the second guide surface 140 is not particularly limited and may be an appropriate angle in consideration of the positions of the battery 200 and the electrode 300. In addition, the second guide surface 140 is not necessarily arranged parallel to the first guide surface 130, and may have an appropriate angle such that the insulation sheet 500 to be described later is correctly inserted between the battery 200 and the electrode 300.

The battery 200 may be arranged in the internal space of the case 100. For example, as illustrated in FIG. 2, the battery 200 may be arranged in an inner lower portion of the case 100 and mounted on the structure 400.

According to an embodiment, the battery 200 may be a non-rechargeable battery.

The electrode 300 may be arranged in the internal space of the case 100 to electrically contact the battery 200. For example, as illustrated in FIGS. 2 and 3, the electrode 300 may be supported on the inside of the case 100 and contact the battery 200.

In an embodiment, the electrode 300 may include a first electrode 310 which is in contact with an upper surface of the battery 200, and a second electrode 320 which is in contact with a lower surface of the battery 200.

The first electrode 310 may be supported at one side of the internal space of the case 100 and may be in contact with the upper surface of the battery 200. The second electrode 320 may be supported at the other side of the internal space of the case 100, and may be arranged on an upper surface of the structure 400 to contact the lower surface of the battery 200. In an embodiment, a circuit of the wearable device 10 may be driven in a state in which both the first electrode 310 and the second electrode 320 are in electrical contact with the battery 200. In an embodiment, the first electrode 310 may be a negative electrode, and the second electrode 320 may be a positive electrode.

In an embodiment, as illustrated in FIGS. 3 and 4, the battery 200 may be provided with a contact groove 201 on the upper surface thereof. In addition, the first electrode 310 may have a terminal 311 that is in contact with the contact groove 201 at an end thereof. In an embodiment, the terminal 311 may have a shape in which one side thereof is convexly curved, and the curved portion may contact the contact groove 201. When the insulation sheet 500 to be described later is inserted between the contact groove 201 and the terminal 311, the electrical contact between the battery 200 and the electrode 300 may be blocked, and a leakage current of the battery 200 may be zero.

The structure 400 may be arranged in the internal space of the case 100, and may be electrically connected to the substrate (not shown). Also, the structure 400 may fix and support other members of the wearable device 10. For example, as illustrated in FIGS. 2 and 3, the structure 400 may be arranged under the case 100, and a lower surface of the structure 400 may be connected to the substrate, and the battery 200 or the electrode 300 may be arranged on the upper surface of the structure 400. In an embodiment, the substrate may be a printed circuit board PCB.

The insulation sheet 500 is insertable or removable with respect to the case 100 through the slot 110, and as the insulation sheet 500 is inserted between the battery 200 and the electrode 300, the electrical contact between the battery 200 and the electrode 300 may be selectively blocked. For example, the insulation sheet 500 may be inserted between the battery 200 and the first electrode 310 or between the battery 200 and the second electrode 320 to block the leakage current of the battery 200.

In an embodiment, the insulation sheet 500 may include an insulation portion 510 and a handle portion 520. It is also possible that the insulation sheet 500 is not insertable after removal. But, in the case that the battery 200 is rechargeable, multiple insertable capabilities may be useful to maintain a charged voltage.

As illustrated in FIG. 5, the insulation portion 510 may include a plate-shaped member extending in the insulation sheet 500 to one side, and may be inserted between the battery 200 and the electrode 300. The insulation portion 510 may block electrical contact between the battery 200 and the electrode 300 to block a leakage current of the battery 200.

The handle portion 520 may be arranged at one side of the insulation portion 510. In an embodiment, the handle portion 520 may extend from one end of the insulation portion 510 and may have a greater width than the insulation portion 510 so that a user may easily grip the handle portion 520.

The wearable device 10 according to an embodiment of the present disclosure may block electrical contact between the battery 200 and the electrode 300 by using the insulation sheet 500, thereby preventing a leakage current of the battery 200.

In detail, as described above, the battery 200 may include a non-replaceable battery. Therefore, in order for the wearable device 10 to operate for a long period of time, it is necessary to secure a sufficient capacity of the battery 200. In particular, in the wearable device 10, the circuit for detecting a start operation of the wearable device 10 is always operating. Thus, there is a need to block unnecessary leakage current generated in the battery 200 when the power thereof is turned off.

In the wearable device 10 according to an embodiment of the present disclosure, the insulation sheet 500 may be inserted between the battery 200 and the electrode 300, thereby blocking electrical contact between the battery 200 and the electrode 300.

That is, the insulation sheet 500 according to an embodiment of the present disclosure may be inserted into the internal space of the case 100 through the slot 110 in a state in which the power of the wearable device 10 is turned off. In an embodiment, as illustrated in FIGS. 6 and 7, the insulation portion 510 may be inserted into the slot 110 while gripping the handle portion 520 of the insulation sheet 500. The insulation portion 510 may slide on the first guide surface 130 and the second guide surface 140 to be inserted between the battery 200 and the first electrode 310 (specifically, between the contact groove 201 and the terminal 311 of the first electrode 310). The electrical contact between the battery 200 and the electrode 300 may be blocked to thereby isolate electrical connection of the circuit of the wearable device 10, thereby preventing a leakage current.

While FIGS. 6 and 7 illustrate that the insulation sheet 500 is inserted between the battery 200 and the first electrode 310, the present disclosure is not limited thereto. For example, the insulation sheet 500 may be inserted between the battery 200 and the second electrode 320 to block electrical contact between the battery 200 and the electrode 300. However, hereinafter, for convenience of description, the description will focus on the insulation sheet 500 being inserted between the battery 200 and the first electrode 310. Note that FIG. 6 shows beginning stage and FIG. 7 shows finishing stage when the insulation sheet 500 is inserted.

In an embodiment, when the insulation portion 510 is inserted between the contact groove 201 and the terminal 311, the terminal 311 may be lifted upward and a bent portion thereof may be unfolded. Accordingly, a space is formed between the contact groove 201 and the terminal 311, and the insulation portion 510 may be smoothly inserted therebetween.

When using the wearable device 10 thereafter, that is, when turning on the power of the wearable device 10, the insulation portion 510 is separated from the case 100 while gripping the handle portion 520 in the internal space of the case 100 through the slot 110 through an opposite operation to an operation of inserting the insulation sheet 500. Accordingly, electrical contact between the battery 200 and the electrode 300 is allowed, and the wearable device 10 is operated accordingly.

The insulation sheet 500 may be formed of an insulating material, and may have both appropriate ductility and rigidity. In an embodiment, the insulation sheet 500 may be a thin film formed of a fiber or plastic material.

In an embodiment, a surface of the insulation sheet 500 may be coated with fluorine. Accordingly, friction generated when the insulation sheet 500 is attached and detached between the battery 200 and the electrode 300 may be reduced, thereby preventing damage to the insulation sheet 500.

In an embodiment, the insulation sheet 500 may further include a guide groove 511.

In detail, as illustrated in FIG. 5, a pair of guide grooves 511 that are inwardly concavely formed may be provided on both sides of the insulation portion 510 in a width direction. Accordingly, the guide grooves 511 may be smoothly seated along an inner side surface of the slot 110 while the insulation sheet 500 is inserted through the slot 110. Alternatively, in a state in which the user grips the guide grooves 511 by hand, the cover 600 to be described later may be easily attached or detached.

The wearable device 10 according to the present disclosure may further include the cover 600.

In an embodiment, as illustrated in FIG. 5, the cover 600 may be arranged on an upper surface of the insulation sheet 500, that is, an upper surface of the handle portion 520. The cover 600 may be seated in the seating groove 120 to prevent external foreign substances such as moisture or dust from entering the inside of the case 100.

In detail, when the wearable device 10 is not used, as described above, the insulation sheet 500 may be inserted between the battery 200 and the electrode 300 to block the leakage current of the battery 200. In this state, the cover 600 may be arranged on the upper surface of the handle portion 520 of the insulation sheet 500.

Thereafter, when the insulation sheet 500 is separated between the battery 200 and the electrode 300 to use the wearable device 10, the slot 110 is opened. The wearable device 10 according to an embodiment of the present disclosure is an electronic device that allows a user to carry out daily life routines while wearing the wearable device 10, and when the user carries out daily life routines with the slot opened, foreign substances such as moisture or dust may enter into the case 100 through the slot 110. To prevent this, the cover 600 may be seated in the seating groove 120 to cover the slot 110.

In an embodiment, the cover 600 may have a shape corresponding to the seating groove 120. In an embodiment, the cover 600 may have a height corresponding to the height h1 of the seating groove 120.

In an embodiment, the cover 600 may be detachable with respect to the insulation sheet 500. For example, the cover 600 may have an adhesive member (not shown) on one surface thereof, and may be detachably attached to the insulation sheet 500 through the adhesive member.

In another embodiment, the cover 600 may include an insertion slit (not shown), into which one end of the handle portion 520 of the insulation sheet 500 is inserted. For example, the cover 600 may include a separate member attached to a lower surface thereof, and a thin slit may be formed in one surface of the member, and the insulation sheet 500 may be inserted or removed through the slit.

In an embodiment, the cover 600 may include a waterproof portion 610 and an observation portion 620.

In detail, as illustrated in FIG. 5, the waterproof portion 610 may be arranged to cover an upper surface of the cover 600. Accordingly, penetration of moisture or dust through the slot 110 while the cover 600 is seated in the seating groove 120 may be prevented.

The observation portion 620 may be arranged between the waterproof portion 610 and the handle portion 520, and may include a through hole (reference numeral not shown) having a shape corresponding to the slot 110.

In an embodiment, the wearable device 10 may further include an indicator 800 that displays a current state of the wearable device 10 by using light.

In detail, the indicator 800 may be arranged on the upper surface of the structure 400 and coaxially arranged with a central axis Ax of the slot 110. Also, the observation portion 620 may be arranged such that the central axis Ax passes through the through hole.

Accordingly, the user may check the light emitted from the indicator 800 via the observation portion 620 and the current state of the wearable device 10, without having to separate the cover 600 from the seating groove 120.

In an embodiment, the cover 600 may further include a protective film 630.

For example, the protective film 630 may be further arranged on a lower surface of the observation portion 620 to further block external foreign substances. In addition, the protective film 630 may include a light-transmissive material.

A pad 700 may be arranged under the case 100 to be connected to the structure 400, as illustrated in FIG. 1. In an embodiment, the pad 700 may include a material that may be easily attached to the body of the user. In an embodiment, the pad 700 may include a plurality of electrode elements (not shown) to measure an electrocardiogram.

The wearable device 10 according to an embodiment of the present disclosure may block electrical contact between the battery 200 and the electrode 300 by using the insulation sheet 500. Accordingly, also when the wearable device 10 is turned off, unnecessary leakage current caused due to operation of an internal circuit of thereof may be blocked.

According to the wearable device 10 according to an embodiment of the present disclosure, when using wearable device 10 while the insulation sheet 500 is separated from the wearable device 10, penetration of foreign substances thereinto may be prevented by using the cover 600.

As the wearable device of the embodiment of the present disclosure includes a structure for preventing leakage current, the storage time of the wearable device may be increased.

While the present disclosure has been described above with reference to the embodiments illustrated in the drawings, these are merely examples. It will be understood by those of ordinary skill in the art that various changes in form and details may be made therein without departing from the spirit and scope of the present disclosure as defined by the following claims. Therefore, the technical scope of the present disclosure should be determined based on the appended claims.

The particular implementations shown and described herein are illustrative examples and are not intended to otherwise limit the scope of the embodiments in any way. For the sake of brevity and clarity, conventional techniques and configurations may not be described in detail. Furthermore, the connecting lines, or connectors between the components shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

The use of the terms "a" and "an" and "the" and similar referents in the context of describing the present disclosure and in the context of the following claims are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The embodiments are not necessarily limited according to the order of description of the above steps. The use of any and all examples, or exemplary language (e.g., "such as") provided herein, is intended merely to better illuminate the present disclosure, and does not pose a limitation on the scope of the present disclosure unless otherwise claimed. Numerous modifications and adaptations will be readily apparent to those skilled in this art without departing from the spirit and scope of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A wearable device comprising:
a case having a structure which is electrically connected to a substrate and included in an internal space of the case and a slot formed in an upper surface of the case and communicating with the internal space wherein the case further comprises a seating groove which forms a step with respect to the upper surface of the case such that the slot is arranged in an inner portion of the case;
a battery arranged on the structure;
a first electrode which is supported at one side of the structure and contacts one surface of the battery;
a second electrode which is supported at the other side of the structure and contacts the other surface of the battery; and
an insulation sheet that is inserted or removed through the slot and inserted between the battery and the first electrode or between the battery and the second electrode to block a leakage current of the battery;
wherein the wearable device further comprises a cover which is detachably coupled to one side of the insulation sheet, and while the cover is separated from the insulation sheet, the cover is seated in the seating groove and covers the slot.

2. The wearable device of claim 1, wherein the insulation sheet comprises:
an insulation portion inserted between the battery and the first electrode or between the battery and the second electrode to block electrical contact; and
a handle portion extending from one side of the insulation portion and having a greater width than the insulation portion.

3. The wearable device of claim 1, wherein:
- the insulation sheet is inserted between the battery and the first electrode or between the battery and the second electrode through the slot to block electrical contact, when the wearable device is turned off, and
- the insulation sheet is separated from the case through the slot when the wearable device is turned on, to allow electrical contact between the battery and the first electrode or between the battery and the second electrode.

4. The wearable device of claim 1, wherein the cover further comprises:
- an observation portion having a through hole having a shape corresponding to the slot;
- a waterproof portion arranged to cover an upper surface of the observation portion; and
- a protective film arranged on a lower surface of the observation portion and comprising a light-transmissive material.

5. The wearable device of claim 1, wherein the insulation sheet comprises a thin film including fiber or a plastic material, and a surface of the insulation sheet is coated with fluorine.

6. The wearable device of claim 1, wherein the case further comprises:
- a first guide surface arranged in an upper portion of the case and adjacent to the slot and inclined toward the inner portion of the case; and
- a second guide surface that is arranged in the upper portion of the case apart from the first guide surface and inclined at an angle equal to or different from the first guide surface.

* * * * *